July 22, 1952    E. B. HUDSON    2,604,572
CLOSET DRIER
Filed March 1, 1950

INVENTOR.
Edwin B. Hudson
BY
Wood, Arey, Henson & Evans
ATTORNEYS

Patented July 22, 1952

2,604,572

UNITED STATES PATENT OFFICE 2,604,572

CLOSET DRIER

Edwin B. Hudson, Middletown, Ohio

Application March 1, 1950, Serial No. 147,035

4 Claims. (Cl. 219—38)

This invention relates to a closet drier and is particularly concerned with a simple, inexpensive and efficient device for drying a closet or some other small confined space to prevent mildew, mold and musty odors.

In tropical climates particularly, such as the southern States where warm and humid air prevails and the relative humidity frequently exceeds eighty percent, a tremendous amount of damage is caused to clothes, textiles, paper, leather and the like by mildew and mold, and the musty odor thereby created is a source of great annoyance. This is particularly true of small confined spaces, such as closets and attic rooms, where air cannot circulate freely. The lack of central heating in practically all of the houses and buildings in this area adds to the difficulty, but the same problem of formation of mold and mildew exists in all localities where the relative humidity rises above sixty percent, which includes at some time of the year all of the United States, except possibly the ten mountain States.

It has been scientifically determined that mold and mildew are caused by small spores which float freely in the air, having about the same specific gravity as air. These same spores also cause the musty odor found in closets or other small confined spaces and enclosed rooms. The spores are exceedingly small and cannot be seen except with a microscope. They are usually balloon-shaped and are associated with or contained in small particles of moisture. The spores float in the air until they alight on an oily surface of any kind. There they grow and multiply, forming mold and mildew which quickly rots and destroys the host material. Warm and moist air are essential to their life and growth. If the spores are exposed to a temperature in excess of 144° F., they are quickly destroyed. The problem has been to find a simple, inexpensive means and method of exposing the spores in sufficient numbers to a temperature sufficiently high to destroy them.

Various devices and expedients have heretofore been used in an attempt to remedy these conditions, but none have proved entirely satisfactory. For example, jars containing calcium chloride have been utilized to absorb moisture from the air which includes the moisture associated with the spores, but these jars quickly become saturated and have to be emptied and the calcium chloride must be replaced frequently. Lighted electric light bulbs of high wattage have provided a partial solution, but are not wholly effectual because they do not cause sufficient circulation of air even in a small confined space, such as a closet, and accordingly do not reach all of the spores even in a small area. In addition, a lighted electric light bulb constitutes a fire hazard and this practice is frowned upon by insurance companies and safety organizations.

The principal object of the present invention has been to provide an electrical means for solving the mold and mildew problem as above described. Another object has been to provide an electrical heating means which can be readily utilized in a small confined space, such as a storage closet, and which at the same time does not constitute a fire hazard even when it is maintained in continuous operation. A further object has been to provide an electrical heating means producing a stack effect so that upon installation in a small confined space all of the spore bearing air in the space will be subjected to the action of the destroying heat.

Another important object has been to provide a cooling or insulating means whereby all surfaces of the device which may be exposed to contact with walls, clothes or other objects in the closet will be continuously maintained well below the ignition temperature of any object with which they may come into contact. Still another object has been to provide a simple and effective device for accomplishing the desired purpose which can be manufactured and sold at a price competitive with the makeshift devices previously referred to and which can be operated at a very small cost.

Other objects and advantages will be apparent from the further and more detailed description of the invention when considered in conjunction with the drawings in which.

Figure 1:
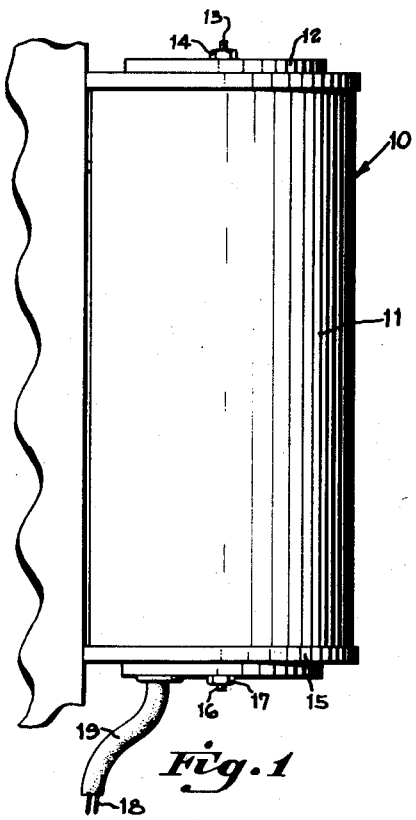
Figure 1 is a side elevation of a preferred embodiment of the device of the invention installed on a wall, such as for example, the inner wall of a closet.

The general exterior assembly is best illustrated in Figure 1 in which the entire device has been designated generally as 10. The elements visible from the exterior comprise an exterior casing 11 of generally cylindrical configuration formed from metal, plastic, or the like. A cap 12 is fitted in position on the upper edges of the casing and maintained in position by the rod 13 having a screw threaded end on which is affixed a nut 14. A bottom cap 15 of similar construction is fitted to the lower end of the casing and is secured in position by the rod 16 and the nut 17. A lead wire 18 is inserted into the lower end of the casing through an aperture in the bottom cap 15 and may be suitably insulated in a conventional manner as indicated at 19. The device may be affixed to the wall by suspending it on a screw 20 from the slot 21 in the outer casing or by any other suitable attachment means.

Figure 2:
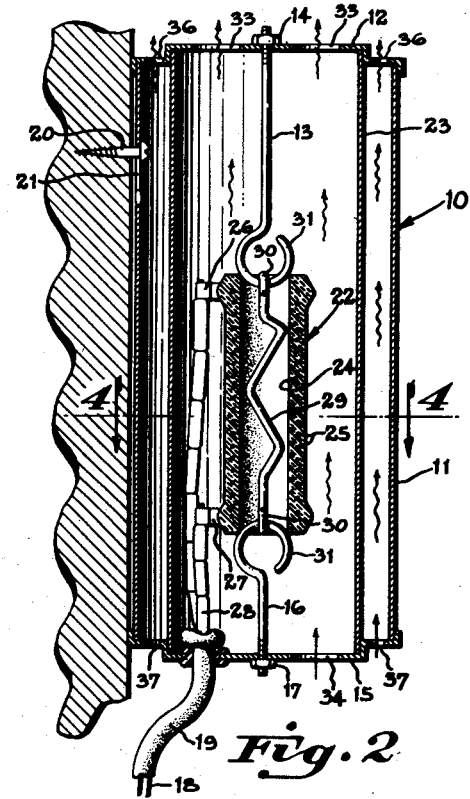
Figure 2 is a sectional view through the device showing the assembly and arrangement of the parts.

As shown in Figure 2, a heating element 22 preferably of generally cylindrical configuration is suspended in the interior of an inner casing designated 23. This element preferably includes a hollow ceramic cylinder 24 in which is wound a resistance wire 25 suitably connected to electric terminals 26 and 27. The lead wire 18 is preferably insulated inside of the cylinder by ceramic insulating sections 28 of a well known type.

Inserted through the bore in the element 22 is a zig-zag bent wire 29 having a loop 30 formed at each end. Each loop is adapted to be engaged by a hook 31 formed at the inner end of each of the rods 13 and 16. The exterior diameter of the respective hooks 31—31 is greater than the diameter of the bore in the element 22 to prevent movement of the cylinder in the casing, the bent wire 29 being under slight tension between them. Accordingly, it will be seen that the heating element is suspended at all times in substantially the center of the casing where it is exposed to a maximum contact with air passing through the casing and where it cannot contact and overheat the sides, top or bottom of the casing. At the same time, the element 22 can readily be removed from the casing if this should prove to be necessary for any reason.

Figure 3:
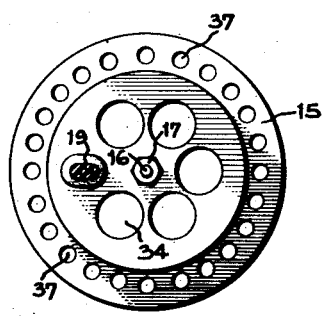
Figure 3 is a bottom plan view looking upward.
Figure 4:
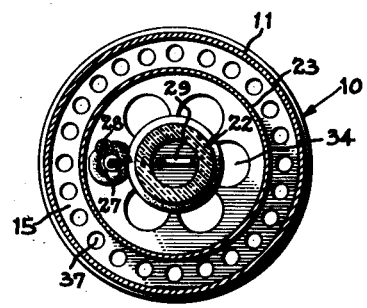
Figure 4 is a sectional view along the line 4—4, Figure 2.

A continuous series of apertures 33 are formed in the upper cap 12 and are interconnected to the interior of the inner casing 23 and a similar series of apertures 34 are formed in the lower cap 15 as particularly shown in Figures 3 and 4.

As the air in the closet enters the apertures 34 it becomes heated, rises and passes out through the apertures 33 thereby creating the desired stack effect. While a certain portion of the air will pass through the bore of the heating element, it is not absolutely essential that all of the air do this because the inner casing 23 is a stack in and of itself.

The outer casing 11 surrounds the entire inner casing 23 and is spaced therefrom. Casing 11 is separated from the heating element by the wall of the interior casing 23 and the space between the two casings and has a series of apertures 36 in its upper surface and a similar series of apertures 37 in its lower surface. As the room air enters the space between the outer and inner casings through the apertures 37, it is at room temperature, but upon contact with the outer surface of the inner casing, it absorbs a certain amount of heat from this surface and rises, passing through the upper outlet apertures 36 taking with it the heat which has been absorbed and permitting the entry of new air at room temperature. In this way, the interior space defined by the outer casing 11 is maintained at a relatively cool temperature substantially below the temperature of the air adjacent the heating element.

From the above it will be perceived that the flow of electricity through the lead wire 18 and thence through the resistance wire 25 heats the latter wire from 80 to 100° F. above room temperature. This in turn heats the air in the entire inner casing and particularly in the bore of the element 22 well above the spore killing temperature of 144° F., thereby destroying the spores which have entered the inner casing with the air stream. At the same time, the action of the heat on the air stream is effective to reduce the relative humidity and moisture content of the closet from ten to forty percent below that of adjoining rooms and below the point where mold and mildew can readily grow. The double stack effect which is created causes all of the air in a small confined space to pass through the unit in a comparatively short space of time, thereby destroying all or substantially all of the spores in the closet.

The safety precautions provided by the suspension of the heating unit in the inner casing and by the outer casing 35 effectively negative any likelihood of fire damage because there is no point on the outer surface of the device where the temperature can become sufficiently high to cause ignition of even the most inflammable materials. In addition, the construction is such that this condition cannot occur even if the device should drop to the floor or be subjected to a sharp blow of some sort.

The cost of operation of the device is exceedingly low, less in fact than that of chemical devices which have heretofore been in use. While it is unnecessary to keep it in operation constantly, even a continuous operation over a period of weeks or months does not consume any very substantial amount of electricity.

The various elements of the device are commercially available or can readily be fabricated by stamping and the assembly has been simplified to a point where the over-all cost of manufacture is very low.

While the form of the device which has been herein described constitutes the preferred form, it will be obvious that various changes and departures can be made in the exact construction without departing from the principles of the invention as herein set out.

Accordingly, I desire to be limited only by the ensuing claims.

1. A device for destroying air borne spores in a small confined space by subjecting them to the action of heat comprising a pair of concentrically disposed cylinders adapted to be mounted vertically, said cylinders defining an inner passageway and an outer passageway, a pair of substantially identical apertured end caps having seats adapted to receive the respective ends of the cylinders, a cylindrical heating element formed of ceramic material, a resistance wire associated with said element, means for energizing the resistance wire, and means mounting said element within the inner passageway in spaced relationship to the respective end caps with the axis of the element parallel to the axes of the cylinders, the last named means including a pair of rods, each rod of the pair being disposed at an end of the element, means holding the respective inner ends of the rods in supporting contact with opposite ends of the element, the outer end of each rod being threaded and extending through an aperture in an end cap, and a nut upon each of the threaded ends of the rods, the respective nuts tightened against the outside of the end caps, whereby the caps are held in seated relationship with the cylinders and the heating element is held in spaced relationship to the end caps and to the wall of the inner cylinder.

2. A device for destroying air borne spores in a small confined space by subjecting them to the action of heat comprising three concentrically disposed cylinders, the outer two of the cylinders being substantially longer than the inner one, a pair of substantially identical aperture end caps having seats adapted to receive the respective ends of the two outer cylinders, the inner cylinder formed of ceramic material having a resistance wire associated therewith and constituting a heating element, means for energizing the resistance wire, means mounting the inner cylinder in spaced relationship to the end caps, the last named means including a stiff spring element disposed longitudinally within the inner cylinder, said spring element having a loop formed at each end, a pair of rods, each rod of the pair disposed at an end of the heating element, each rod having a loop at its inner end of greater diameter than the inside diameter of the inner cylinder linked with a loop at the end of the spring element, whereby the loops on the rods are held against the ends of the heating element under the tension of the spring element, the outer ends of the rods threaded and passing through apertures in the respective end caps, a nut engaged upon the threaded end of each rod and tightened against the outside of the adjacent end cap, whereby the rods function to support the heating element and hold the respective end caps in place thereby securing the parts of the device together as a unit.

3. In a device for destroying air borne spores in a small confined space by subjecting them to the action of heat, said device including a vertically disposed cylinder having apertured end caps thereon, means for mounting a cylindrical heating element axially of and within said cylinder comprising a zig-zag bent wire disposed longitudinally within said heating element, said wire being shorter than the element and having a loop formed at each end, a pair of rods, each rod of the pair disposed at an end of the heating element and extending axially therefrom, a loop formed at the inner end of each of the rods, each of said loops of the rods being of greater diameter than the inside diameter of said element and linked with a loop at an end of the zig-zag bent wire, the outer ends of said rods secured to the respective end caps, and said zig-zag bent wire being under tension between the respective loops of the rods whereby they are pulled into engagement with the respective ends of the heating element thereby supporting the element between them.

4. In a device for destroying air borne spores in a small confined space by subjecting them to the action of heat, said device including a cylinder adapted to be mounted in a vertical position, and with apertured end caps enclosing the respective ends of the cylinder, means for mounting a cylindrical heating element axially of and within said cylinder comprising a stiff spring disposed within the heating element, said spring being shorter than the element, a pair of rods, each rod of the pair disposed at an end of the heating element and attached at its inner end to an end of the stiff spring element, each rod having an aubtment at its inner end adapted to engage an end of the cylinder whereby the respective abutments on the rods are held in engagement with the cylinder under the tension of the spring, and the outer ends of the rods secured to the respective end caps.

EDWIN B. HUDSON.

REFERENCES CITED

The following references are of record in the file of this patent:

UNITED STATES PATENTS

| Number | Name | Date |
| --- | --- | --- |
| 1,694,175 | Hauser | Dec. 4, 1928 |
| 2,042,264 | Leven Hagen | May 26, 1936 |
| 2,391,207 | Van Schaack | Dec. 18, 1945 |